United States Patent

Moriwaki et al.

(10) Patent No.: US 9,504,114 B2
(45) Date of Patent: Nov. 22, 2016

(54) ILLUMINATION CONTROL APPARATUS AND ILLUMINATION CONTROL METHOD

(71) Applicant: Panasonic Intellectual Property Management Co., Ltd., Osaka (JP)

(72) Inventors: Toshiya Moriwaki, Kyoto (JP); Akihiro Kishimoto, Osaka (JP); Naotake Katayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/040,255

(22) Filed: Feb. 10, 2016

(65) Prior Publication Data

US 2016/0262238 A1 Sep. 8, 2016

(30) Foreign Application Priority Data

Mar. 4, 2015 (JP) .................................. 2015-042990

(51) Int. Cl.
*H05B 37/02* (2006.01)
*H05B 33/08* (2006.01)

(52) U.S. Cl.
CPC ...... *H05B 33/0854* (2013.01); *H05B 37/0227* (2013.01); *H05B 37/0281* (2013.01)

(58) Field of Classification Search
CPC .......... H05B 33/0854; H05B 37/0227; H05B 37/0281
USPC ......................... 315/291, 294, 297, 307–308
See application file for complete search history.

(56) References Cited

U.S. PATENT DOCUMENTS

| | | | | |
|---|---|---|---|---|
| 6,388,399 B1* | 5/2002 | Eckel | ..................... | G01K 1/024 315/158 |
| 7,796,034 B2* | 9/2010 | Laski | ................. | H05B 33/0842 340/539.22 |
| 8,710,746 B2 | 4/2014 | Takahashi et al. | | |
| 8,836,505 B2 | 9/2014 | Noda et al. | | |
| 8,941,330 B2* | 1/2015 | Ng | ................................ | 315/307 |
| 2006/0250237 A1* | 11/2006 | Whitten | ................... | G08B 5/38 340/541 |
| 2012/0019168 A1* | 1/2012 | Noda | ................. | H05B 37/0227 315/307 |
| 2013/0127346 A1 | 5/2013 | Takahashi et al. | | |

FOREIGN PATENT DOCUMENTS

| | | |
|---|---|---|
| JP | 05-121173 A | 5/1993 |
| JP | 07-023470 A | 1/1995 |
| JP | 09-283282 A | 10/1997 |
| JP | 11-191493 A | 7/1999 |

(Continued)

*Primary Examiner* — Jason M Crawford
(74) *Attorney, Agent, or Firm* — Renner, Otto, Boisselle & Skylar, LLP

(57) ABSTRACT

An illumination control apparatus including a controller which: in switching a first lighting mode to a second lighting mode when a combination of results of detections by occupancy sensors changes, compares a first priority level pre-assigned to the first lighting mode and a second priority level pre-assigned to the second lighting mode; if the second priority level is lower than the first priority level, maintains the first lighting mode for a predetermined amount of wait time from a moment when the combination of the results of the detections changes, and subsequently switches the first lighting mode to the second lighting mode; and if the second priority level is higher than the first priority level, switches the first lighting mode to the second lighting mode at the moment when the combination of the results of the detections changes.

7 Claims, 16 Drawing Sheets

(56) References Cited

FOREIGN PATENT DOCUMENTS

| JP | 2009-123608 A | 6/2009 |
| JP | 2012-028015 A | 2/2012 |
| JP | 2012-028272 A | 2/2012 |
| JP | 2012-043605 A | 3/2012 |
| JP | 2013-069504 A | 4/2013 |
| JP | 2013-109876 A | 6/2013 |

* cited by examiner

FIG. 3

| OCCUPANCY SENSOR | | ILLUMINATION CONTROL | SPATIAL ILLUMINANCE | PRIORITY LEVEL |
|---|---|---|---|---|
| S1 | S2 | | | |
| YES | YES | LIGHTING MODE 1 | 100% | 1 |
| YES | NO | LIGHTING MODE 2 | 80% | 2 |
| NO | YES | LIGHTING MODE 3 | 60% | 3 |
| NO | NO | LIGHTING MODE 4 | 30% | 4 |

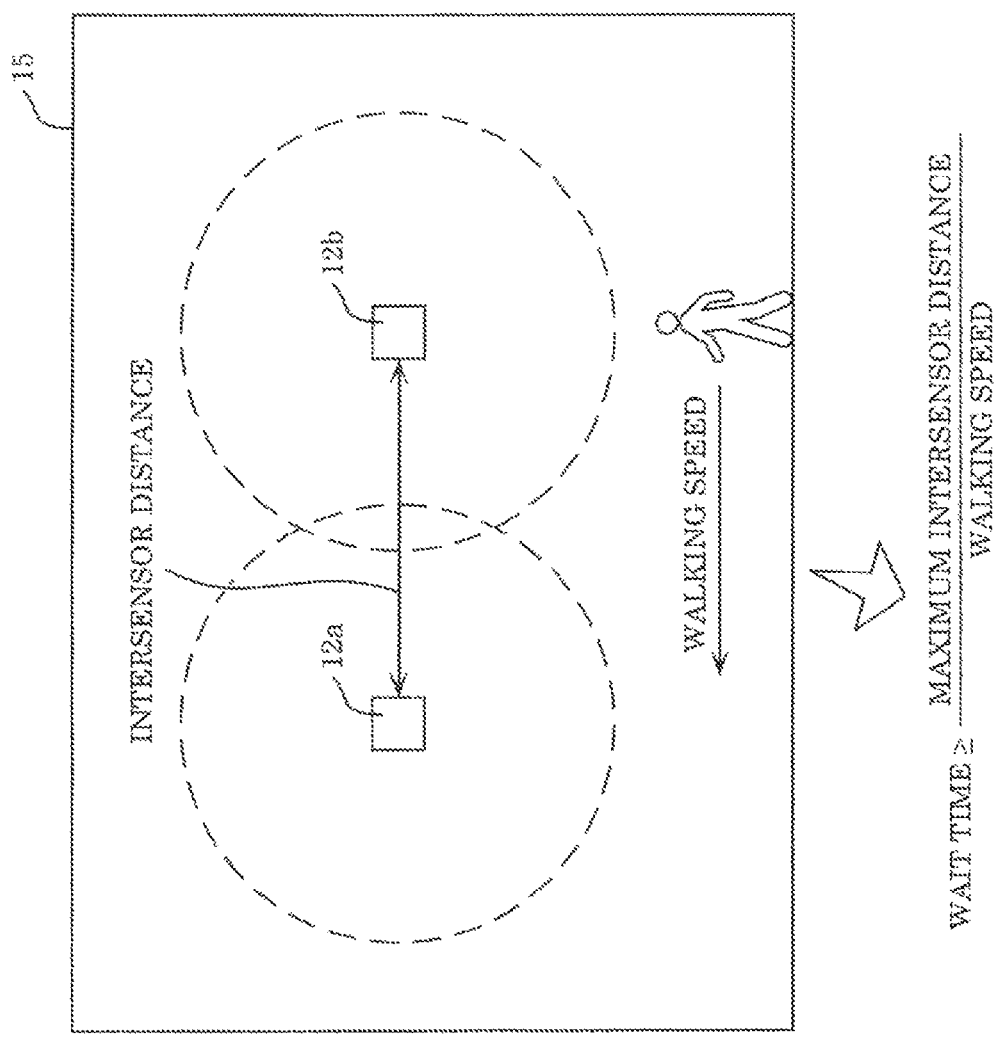

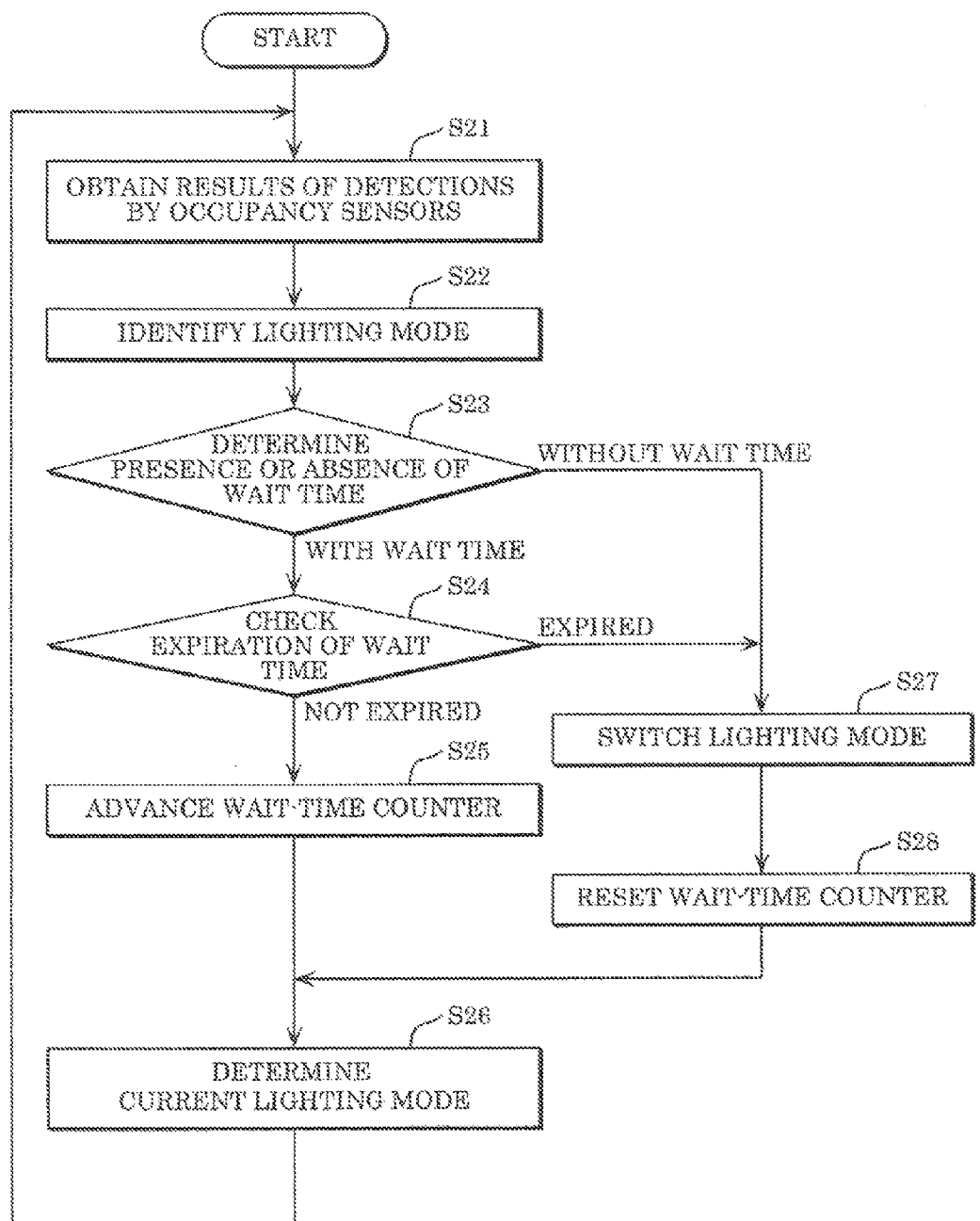

FIG. 7

| SWITCHED FROM \ SWITCHED TO | LIGHTING MODE 1 | LIGHTING MODE 2 | LIGHTING MODE 3 | LIGHTING MODE 4 |
|---|---|---|---|---|
| LIGHTING MODE 1 | | WITH WAIT TIME | WITH WAIT TIME | WITH WAIT TIME |
| LIGHTING MODE 2 | WITHOUT WAIT TIME | | WITH WAIT TIME | WITH WAIT TIME |
| LIGHTING MODE 3 | WITHOUT WAIT TIME | WITHOUT WAIT TIME | | WITH WAIT TIME |
| LIGHTING MODE 4 | WITHOUT WAIT TIME | WITHOUT WAIT TIME | WITHOUT WAIT TIME | |

22b ( WITH WAIT TIME : FIRST SWITCHING MODE
WITHOUT WAIT TIME : SECOND SWITCHING MODE )

FIG. 9A (BEFORE ALTERATION)

| OCCUPANCY SENSOR ||  ILLUMINATION CONTROL | SPATIAL ILLUMINANCE | PRIORITY LEVEL |
| S1 | S2 | | | |
|---|---|---|---|---|
| YES | YES | LIGHTING MODE 1 | 100% | 1 |
| YES | NO | LIGHTING MODE 2 | 80% | 2 |
| NO | YES | LIGHTING MODE 3 | 60% | 3 |
| NO | NO | LIGHTING MODE 4 | 30% | 4 |

⇩

(AFTER ALTERATION)

| OCCUPANCY SENSOR ||  ILLUMINATION CONTROL | SPATIAL ILLUMINANCE | PRIORITY LEVEL |
| S1 | S2 | | | |
|---|---|---|---|---|
| YES | YES | LIGHTING MODE 1 | 100% | 1 |
| YES | NO | LIGHTING MODE 2 | 20% | 4 |
| NO | YES | LIGHTING MODE 3 | 60% | 3 |
| NO | NO | LIGHTING MODE 4 | 70% | 2 |

FIG. 9B (BEFORE ALTERATION)

| SWITCHED TO / SWITCHED FROM | LIGHTING MODE 1 | LIGHTING MODE 2 | LIGHTING MODE 3 | LIGHTING MODE 4 |
|---|---|---|---|---|
| LIGHTING MODE 1 |  | WITH WAIT TIME | WITH WAIT TIME | WITH WAIT TIME |
| LIGHTING MODE 2 | WITHOUT WAIT TIME |  | WITH WAIT TIME | WITH WAIT TIME |
| LIGHTING MODE 3 | WITHOUT WAIT TIME | WITHOUT WAIT TIME |  | WITH WAIT TIME |
| LIGHTING MODE 4 | WITHOUT WAIT TIME | WITHOUT WAIT TIME | WITHOUT WAIT TIME |  |

(AFTER ALTERATION)

| SWITCHED TO / SWITCHED FROM | LIGHTING MODE 1 | LIGHTING MODE 2 | LIGHTING MODE 3 | LIGHTING MODE 4 |
|---|---|---|---|---|
| LIGHTING MODE 1 |  | WITH WAIT TIME | WITH WAIT TIME | WITH WAIT TIME |
| LIGHTING MODE 2 | WITHOUT WAIT TIME |  | WITHOUT WAIT TIME | WITHOUT WAIT TIME |
| LIGHTING MODE 3 | WITHOUT WAIT TIME | WITH WAIT TIME |  | WITHOUT WAIT TIME |
| LIGHTING MODE 4 | WITHOUT WAIT TIME | WITH WAIT TIME | WITH WAIT TIME |  |

PERCENTAGE OF DIMMING OF LIGHTING DEVICE

|  | LIGHT 1 | LIGHT 2 | LIGHT 3 | LIGHT 4 | LIGHT 5 | SPATIAL ILLUMINANCE |
|---|---|---|---|---|---|---|
| LIGHTING MODE 1 | 100 | 100 | 100 | 100 | 100 | 100% |
| LIGHTING MODE 2 | 100 | 100 | 70 | 70 | 60 | 80% |
| LIGHTING MODE 3 | 40 | 40 | 80 | 70 | 70 | 60% |
| LIGHTING MODE 4 | 30 | 30 | 30 | 30 | 30 | 30% |

(b)

|  | LIGHT 1 (lm) | LIGHT 2 (lm) | LIGHT 3 (lm) | LIGHT 4 (lm) | SPATIAL ILLUMINANCE |
|---|---|---|---|---|---|
| RATED LUMINOUS FLUX (lm) | 2000 | 1500 | 1500 | 1000 | — |
| LIGHTING MODE 1 | 2000 | 1500 | 1500 | 1000 | 100% |
| LIGHTING MODE 2 | 1500 | 1500 | 1300 | 500 | 80% |
| LIGHTING MODE 3 | 800 | 600 | 1400 | 800 | 60% |
| LIGHTING MODE 4 | 450 | 450 | 450 | 450 | 30% |

FIG. 13

| OCCUPANCY SENSOR | | ILLUMINATION CONTROL | COLOR TEMPERATURE | PRIORITY LEVEL |
|---|---|---|---|---|
| S1 | S2 | | | |
| YES | YES | LIGHTING MODE 1 | 5000 K | 2 |
| YES | NO | LIGHTING MODE 2 | 2800 K | 3 |
| NO | YES | LIGHTING MODE 3 | 6200 K | 1 |
| NO | NO | LIGHTING MODE 4 | 2500 K | 4 |

| SWITCHED FROM \ SWITCHED TO | LIGHTING MODE 1 | LIGHTING MODE 2 | LIGHTING MODE 3 | LIGHTING MODE 4 |
|---|---|---|---|---|
| LIGHTING MODE 1 | | WITH WAIT TIME | WITHOUT WAIT TIME | WITH WAIT TIME |
| LIGHTING MODE 2 | WITH WAIT TIME | | WITHOUT WAIT TIME | WITH WAIT TIME |
| LIGHTING MODE 3 | WITHOUT WAIT TIME | WITHOUT WAIT TIME | | WITH WAIT TIME |
| LIGHTING MODE 4 | WITHOUT WAIT TIME | WITHOUT WAIT TIME | WITHOUT WAIT TIME | |

( WITH WAIT TIME : FIRST SWITCHING MODE
WITHOUT WAIT TIME : SECOND SWITCHING MODE )

ILLUMINATION CONTROL APPARATUS AND ILLUMINATION CONTROL METHOD

CROSS REFERENCE TO RELATED APPLICATION

This application claims the benefit of priority of Japanese Patent Application Number 2015-042990, filed Mar. 4, 2015, the entire content of which is hereby incorporated by reference.

BACKGROUND

1. Technical Field

The present disclosure relates to an illumination control apparatus and an illumination control method, and more particularly, to a technology of controlling illumination in conjunction with results of detections by occupancy sensors.

2. Description of the Related Art

Conventionally, various technologies for controlling illumination in conjunction with results of detections by occupancy sensors are proposed (e.g., see Japanese Unexamined Patent Application Publication No. 2013-109876 (Patent Literature 1)).

According to the technology disclosed in Patent Literature 1, an occupancy sensor determines whether an area is a stay area where a person stays or a non-stay area where a person does not stay, and performs illumination control on the area, depending on the result of the determination. This enables determination as to whether each of division areas into which an illumination area is divided is a stay area or a non-stay area, and allows different illumination controls to be performed for the determined areas.

SUMMARY

However, a problem with the technology disclosed in Patent Literature 1 is that an unintended illumination control is performed when a person is moving from the detection range of one occupancy sensor to the detection range of another occupancy sensor if he/she passes through an area which belongs to none of the detection ranges of the occupancy sensors. In other words, if a person passes through an area which belongs to none of the detection ranges of the occupancy sensors, determination is made that no one is present in the illumination area, and the light is dimmed or turned off.

Thus, a moving person experiences discomfort and is also forced to move from one room to another under a low illuminance or in the dark, ending up being placed in a dangerous situation where he/she may hit things or tumble.

Thus, the present disclosure is made in light of the above situation, and has an object to provide an illumination control apparatus and an illumination control method which provide illumination control with which a moving person is prevented from experiencing discomfort or being placed in a dangerous situation.

To achieve the above object, an illumination control apparatus according one aspect of the present disclosure is an illumination control apparatus which controls illumination of a room in which at least one lighting device having plural lighting modes and at least two occupancy sensors are installed, the illumination control apparatus including: a detection result obtainer which obtains results of detections by the at least two occupancy sensors; a storage storing lighting mode information indicating correspondence between (i) plural combinations of the results of the detections by the at least two occupancy sensors and (ii) the plural lighting modes of the at least one lighting device; and a controller which refers to the lighting mode information, identifies a lighting mode among the plural lighting modes that corresponds to a combination of the results of the detections by the at least two occupancy sensors obtained by the detection result obtainer, and places the at least one lighting device in the identified lighting mode, wherein in switching a first lighting mode to a second lighting mode when the combination of the results of the detections by the at least two occupancy sensors obtained by the detection result obtainer changes, the controller, the first lighting mode and the second lighting mode being included in the plurality of lighting modes: compares a first priority level of the first lighting mode and a second priority level of the second lighting mode, the first priority level and the second priority level being priority levels pre-assigned to the first lighting mode and the second lighting mode, respectively; if the second priority level is lower than the first priority level, maintains the first lighting mode for a predetermined amount of wait time, from a moment when the combination of the results of the detections changes, and subsequently switches the first lighting mode to the second lighting mode; and if the second priority level is higher than the first priority level, switches the first lighting mode to the second lighting mode at the moment when the combination of the results of the detections changes.

Moreover, to achieve the above object, an illumination control method according to one aspect of the present disclosure is an illumination control method for controlling illumination of a room in which at least one lighting device having plural lighting modes and at least two occupancy sensors are installed, the illumination control method including: (a) obtaining results of detections by the at least two occupancy sensors; and (b) referring to lighting mode information indicating correspondence between (i) plural combinations of the results of the detections by the at least two occupancy sensors and (ii) the plural lighting modes of the at least one lighting device, identifying a lighting mode among the plural lighting modes that corresponds to a combination of the results of the detections by the at least two occupancy sensors obtained in step (a), and places the at least one lighting device in the identified lighting mode, wherein in switching a first lighting mode to a second lighting mode when the combination of the results of the detections by the at least two occupancy sensors obtained in step (a) changes, in step (b), the first lighting mode and the second lighting mode being included in the plurality of lighting modes: a first priority level of the first lighting mode and a second priority level of the second lighting mode are compared, the first priority level and the second priority level being priority levels pre-assigned to the first lighting mode and the second lighting mode, respectively; if the second priority level is lower than the first priority level, the first lighting mode is maintained for a predetermined amount of wait time, from a moment when the combination of the results of the detections changes, and subsequently the first lighting mode is switched to the second lighting mode; and if the second priority level is higher than the first priority level, the first lighting mode is switched to the second lighting mode at the moment when the combination of the results of the detections changes.

It should be noted that the present disclosure can be implemented not only as an illumination control apparatus and an illumination control method, but also as a program for causing a computer to execute the illumination control method, and a computer-readable recording medium storing the program.

According to the present disclosure, an illumination control apparatus and an illumination control method are provided which provide illumination control with which a moving person is prevented from experiencing discomfort or being placed in a dangerous situation.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 3 is a diagram showing an example of a data structure of lighting mode information according to Embodiment 1;

FIG. 5 is a diagram showing an example of the definition of "wait time" according to Embodiments 1 and 2;

FIG. 6 is a flowchart illustrating operation of the illumination control system according to Embodiments 1 and 2;

FIG. 7 is a diagram showing an example of a data structure of a state transition table according to Embodiment 1;

FIG. 9A is a diagram showing an example method of altering the lighting mode information in Embodiment 1;

FIG. 9B is a diagram showing an example method of updating the state transition table along with changes in the lighting mode information shown in FIG. 9A;

FIG. 10 is a diagram showing examples of an information table defining "spatial illuminance" in Embodiment 1;

FIG. 13 is a diagram showing an example of a data structure of lighting mode information according to Embodiment 2;

FIG. 14 is a diagram showing an example of a data structure of a state transition table according to Embodiment 2.

DETAILED DESCRIPTION OF THE EMBODIMENTS

Hereinafter, embodiments according to the present disclosure are described, with reference to the accompanying drawings. It should be noted that the embodiments described below are each merely one embodiment of the present disclosure. Values, components, and arrangement and connection between the components, steps and the order of steps, etc., shown in the following embodiments are merely illustrative and not intended to limit the present disclosure. Moreover, among the components of the embodiments below, components not recited in any one of the independent claims defining the most generic part of the present disclosure are described as arbitrary components included in an embodiment.

Embodiment 1

First, an illumination control apparatus and an illumination control method according to the present disclosure are described in detail, with reference to Embodiment 1 (herein, an illumination control system) according to the present disclosure.

Figure 1:
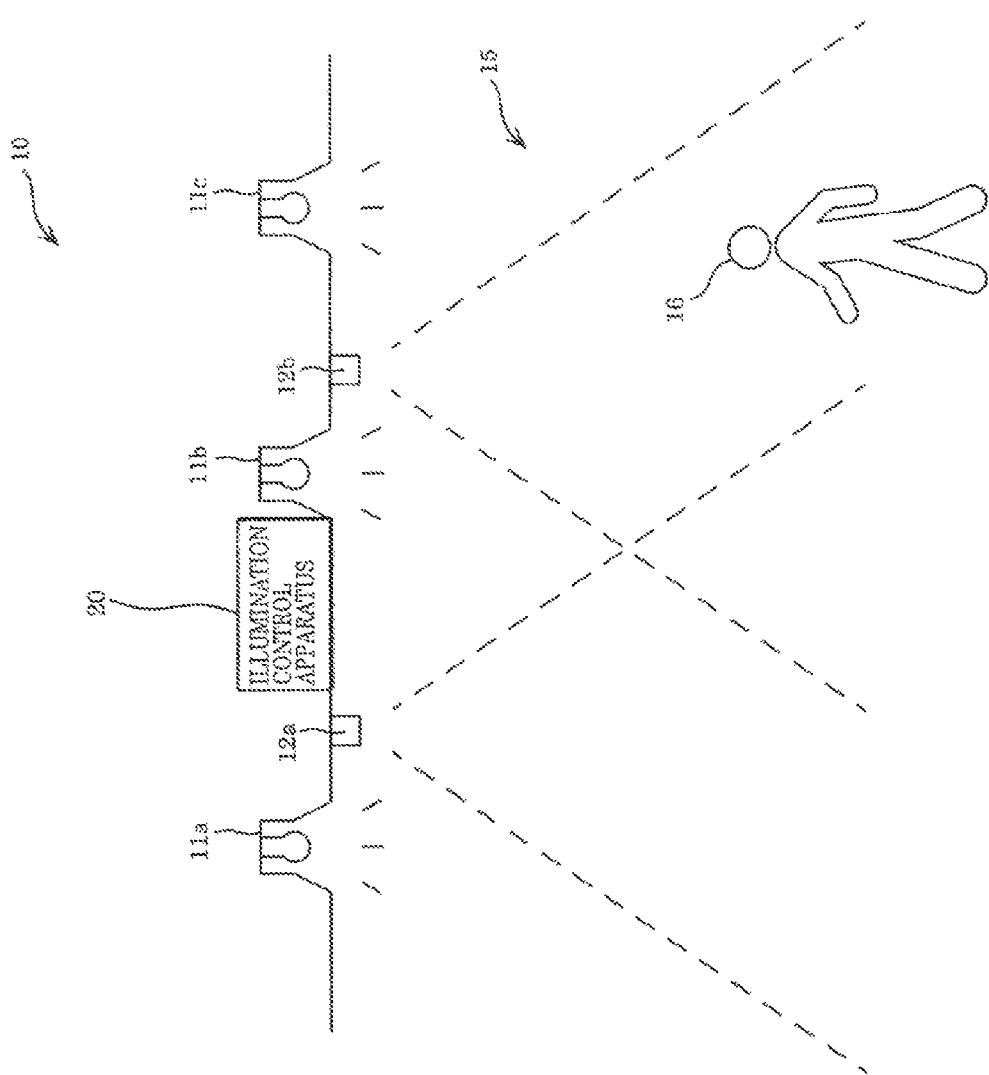
FIG. 1 is a diagram illustrating a situation to which an illumination control system according to Embodiment 1 applies.

FIG. 1 is a diagram illustrating a situation to which illumination control system 10 according to Embodiment 1 applies. The figure illustrates an example where illumination control system 10 is provided in room 15 in which person 16 is resident.

Illumination control system 10 is a system which controls illumination, in conjunction with results of detections by occupancy sensors. Illumination control system 10 includes three lighting devices 11a, 11b, and 11c, two occupancy sensors 12a and 12b, and illumination control apparatus 20.

Lighting devices 11a, 11b, and 11c are devices which together provide illuminations in a plurality of lighting modes, under control by illumination control apparatus 20, and are each, for example, a downlight or a ceiling light which includes an LED light source. The "lighting modes" as used herein refer to operation modes of lighting devices 11a to 11c, and are, in the present embodiment, operation modes which achieve illumination scenes each defined by a spatial illuminance in room 15.

Occupancy sensors 12a and 12b each detect presence or absence of a person, using, for example, infrared light, an ultrasound, or visible light. In FIG. 1, detection ranges of occupancy sensors 12a and 12b are each bounded by two dotted lines.

Illumination control apparatus 20 controls the illumination of room 15 by controlling lighting devices 11a to 11c based on a combination of results of detections by occupancy sensors 12a and 12b. Illumination control apparatus 20 provides illumination control with which person 16 is prevented from experiencing discomfort or being placed in a dangerous situation, even if person 16 moves, passing through an area which belongs to none of the detection ranges of occupancy sensors 12a and 12b.

While three lighting devices 11a, 11b, and 11c are shown in FIG. 1, the present disclosure is not limited thereto. At least one lighting device may be provided. This is because it is possible that at least one lighting device implements a plurality of lighting modes (a plurality of spatial illuminances). However, preferably, a plurality of lighting devices are provided, in order to implement various illumination scenes (the lighting modes).

While two occupancy sensors 12a and 12b are shown in FIG. 1, three or more occupancy sensors may be provided. Moreover, while an input apparatus, such as a remote control and operating switches for manually operating lighting devices 11a to 11c, is not shown in FIG. 1, such an input apparatus may be provided. The input apparatus may be a smartphone or a tablet, for example.

Figure 2:
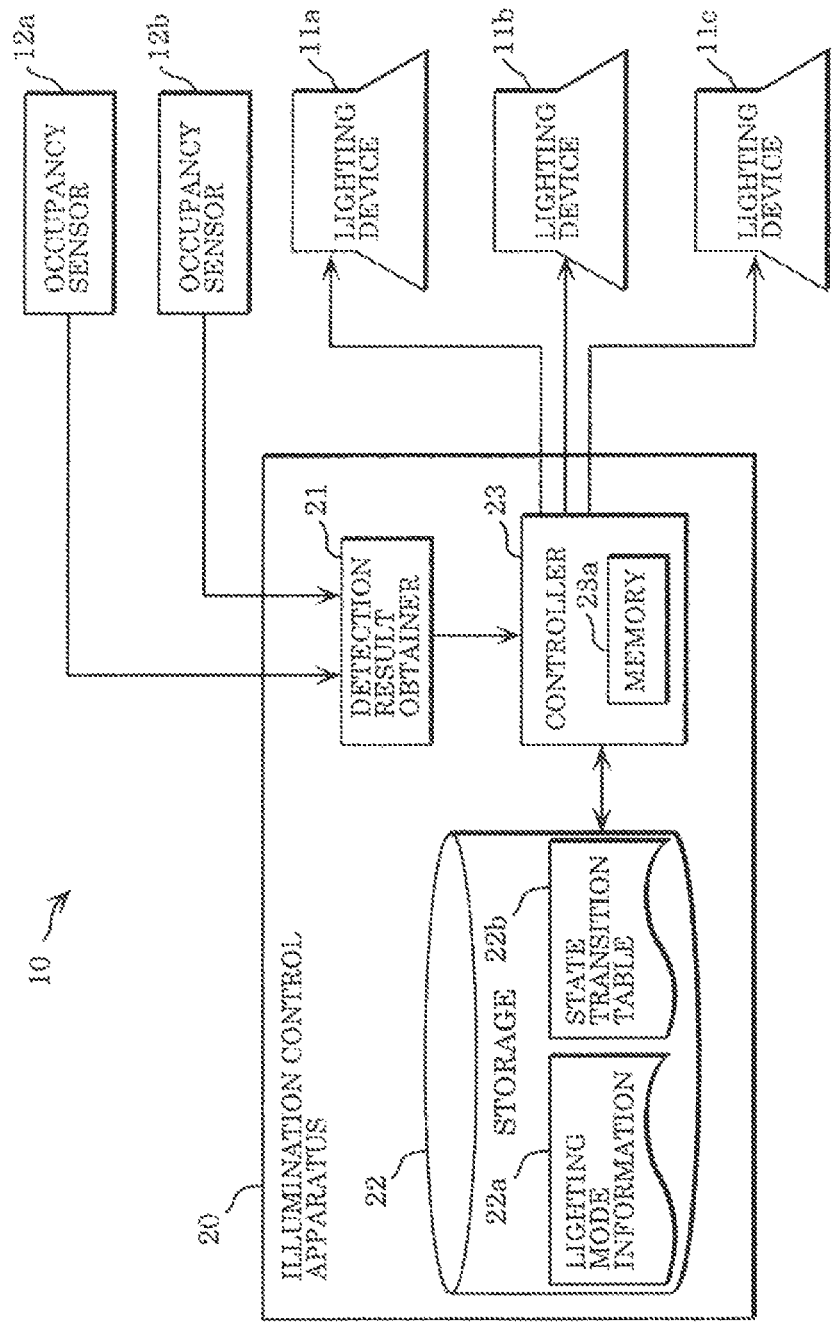
FIG. 2 is a block diagram of a configuration of the illumination control system according to Embodiment 1.

FIG. 2 is a block diagram of a configuration of illumination control system 10 shown in FIG. 1. As shown in the figure, illumination control system 10 includes lighting devices 11a, 11b, and 11c, occupancy sensors 12a and 12b, and illumination control apparatus 20 which is connected via wires or wirelessly to lighting devices 11a, 11b, and 11c and occupancy sensors 12a and 12b.

Illumination control apparatus 20 controls the illumination of room 15 in which one or more lighting devices (here, lighting devices 11a to 11c) each having a plurality of lighting modes and two or more occupancy sensors (here, occupancy sensors 12a and 12b) are installed. Illumination control apparatus 20 includes detection result obtainer 21, storage 22, and controller 23.

Detection result obtainer 21 is by way of example a processing unit, such as a microcomputer, which obtains results of detections by occupancy sensors 12a and 12b, and includes, for example, a communication interface which receives signals transmitted via hard wire or wirelessly from occupancy sensors 12a and 12b, and simple logic gates, or the like.

Storage 22 is a storage medium storing lighting mode information 22a and state transition table 22b, and is, for example, a nonvolatile storage memory such as read-only-memory (ROM).

Lighting mode information 22a is pre-created information such a table as shown in FIG. 3, for example, and indicates correspondence between (i) plural combinations of the results of detections by occupancy sensors 12a and 12b and (ii) the plural lighting modes of lighting devices 11a to 11c.

FIG. 3 is a diagram showing an example of a data structure of lighting mode information 22a. Here, the figure shows correspondence between: the combinations of the results of detections by occupancy sensors 12a and 12b ("S1" and "S2" corresponds to the results of detections by occupancy sensors 12a and 12b, respectively); "ILLUMINATION CONTROL" (the lighting modes); details of the illumination control ("SPATIAL ILLUMINANCE"); and "PRIORITY LEVEL." "YES" and "NO" in the detection result ("S1", "S2") fields correspond to "presence of a person is detected" and "no presence of a person is detected," respectively. The "PRIORITY LEVEL" indicates priority levels associated with the lighting modes, where the higher the "SPATIAL ILLUMINANCE" is, the higher (the smaller numeric value) the priority level is set. "SPATIAL ILLUMINANCE" refers to an illuminance (if illuminances at a plurality of places are used, an average value of the illuminances) in at least one place which is predetermined as a representative place in room 15.

It should be noted that the data structure of lighting mode information 22a is not limited to the structure shown in FIG. 3. For example, lighting mode information 22a may be provided in separate tables, one of which indicating correspondence between the combinations of the results of detections by occupancy sensors 12a and 12b and "ILLUMINATION CONTROL" (the lighting modes), the other of which indicating correspondence between "ILLUMINATION CONTROL" (the lighting modes), details of the illumination control ("SPATIAL ILLUMINANCE"), and "PRIORITY LEVEL."

State transition table 22b is referred to by controller 23 when controller 23 switches the lighting modes of lighting devices 11a to 11c. State transition table 22b is dynamically created by controller 23 from lighting mode information 22a before controller 23 initiates the illumination control. State transition table 22b described below in detail.

Controller 23 includes memory 23a, and is a processing unit which refers to lighting mode information 22a and controls lighting devices 11a to 11c according to a combination of the results of detections by occupancy sensors 12a and 12b obtained by detection result obtainer 21. Controller 23 is, for example, a microcomputer having a program stored in memory 23a or the like. The program stored in memory 23a, when executed by the microcomputer, causes the microcomputer to carry out the functions and controls described herein. More specifically, by referring to lighting mode information 22a, controller 23 identifies a lighting mode corresponding to the combination of the results of detections by occupancy sensors 12a and 12b obtained by detection result obtainer 21. Then, controller 23 controls (here, dims) lighting devices 11a to 11c such that lighting devices 11a to 11c are placed in the identified lighting mode. For example, if lighting devices 11a to 11c are downlights, controller 23 performs, on lighting devices 11a to 11c, phase-control dimming, or diming via dedicated control lines to lighting devices 11a to 11c. The phase-control dimming is performed by controlling the phases of power which is supplied to lighting devices 11a to 11c. If lighting devices 11a to 11c are ceiling lights, controller 23 performs PWM (pulse width modulation) dimming on lighting devices 11a to 11c by sending dimming signals (duty signals) to lighting devices 11a to 11c using infrared light or wireless signals. The PWM dimming is performed by controlling brightness levels of light beams from lighting devices 11a to 11c according to the dimming signals (the duty signals) sent from controller 23.

Here, as characteristic control, controller 23 employs a wait time which depends on a lighting mode to be switched to, by using priority in switching the lighting modes when the combination of the results of detections by occupancy sensors 12a and 12b obtained by detection result obtainer 21 changes.

Figure 4:
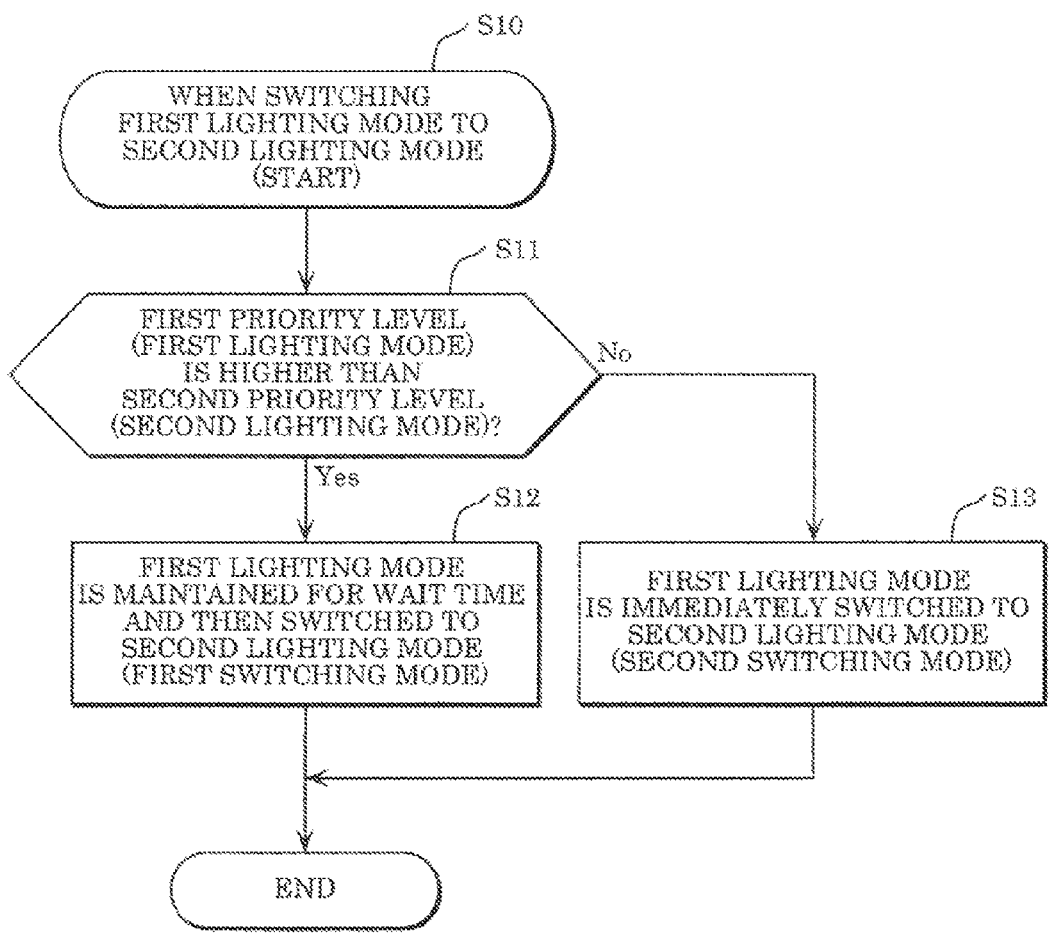
FIG. 4 is a flowchart illustrating a function of lighting-mode switching control using priority, according to Embodiments 1 and 2.

FIG. 4 is a flowchart illustrating the function of the lighting-mode switching control performed by controller 23 using the priority. Assume that controller 23 refers to lighting mode information 22a and is to switch a first lighting mode to a second lighting mode when the combination of the results of detections by occupancy sensors 12a and 12b obtained by detection result obtainer 21 (S10) changes. In this case, controller 23 compares a first priority level and a second priority level. The first priority level is a priority level pre-assigned to the first lighting mode. The second priority level is a priority level pre-assigned to the second lighting mode (S11).

As a result, if the second priority level is lower than the first priority level (Yes in S11), controller 23 executes a first switching mode in which the first lighting mode is maintained for a predetermined amount of wait time from a moment when the combination of the result of detections has changed, and then switched to the second lighting mode (S12). The "wait time" as used herein refers to a time longer than an amount of time calculated by dividing, by a predetermined human walking speed, the greatest distance between any two occupancy sensors (here, occupancy sensors 12a and 12b) among the occupancy sensors installed in room 15, as shown in FIG. 5. In other words, the "wait time" refers to a value preset as such time. If the second priority level is higher than the first priority level (No in S11), controller 23 executes a second switching mode in which the first lighting mode is switched to the second lighting mode at a moment (i.e., immediately) when the combination of the results of detections has changed (S13). It should be noted that "at the moment" as used herein is not necessarily being immediately, and includes "slightly after the moment when the combination of the results of detections has changed.

Owing to such characteristic control performed by controller 23, in switching a lighting mode having a high priority level (i.e., a high spatial illuminance) to a lighting mode having a low priority level (here, a low spatial illuminance) lower than the high priority level, the immediately preceding lighting mode having the high priority level is maintained for the amount of wait time before switching to the lighting mode having the low priority level. Thus, moving person 16 is prevented from experiencing discomfort or being placed in a dangerous situation.

Next, operation of illumination control system 10 according to the present embodiment configured as set forth above is described.

FIG. 6 is a flowchart illustrating operation of illumination control system 10 according to the present embodiment.

Prior to the illumination control, controller 23 included in illumination control apparatus 20 generates state transition table 22b from lighting mode information 22a stored in storage 22 according to the procedure illustrated in FIG. 4, and stores state transition table 22b into storage 22. This generation process is performed one time only unless lighting mode information 22a is altered. Specifically, controller 23 refers to lighting modes and priority levels registered to lighting mode information 22a, and determines, according to the procedure illustrated in FIG. 4, switching modes for all the possible switching combinations of the lighting modes, thereby generating state transition table 22b. For example, in the case of switching from lighting mode 1 to lighting mode 2, controller 23 determines that the first switching mode (i.e., with wait time) is to be executed due to a fact that the priority level ("2") corresponding to lighting mode 2 is lower than the priority level ("1") corresponding to lighting mode 1. Controller 23 determines the switching modes for all the switching combinations of the lighting modes in this manner, according to the procedure illustrated in FIG. 4.

FIG. 7 is a diagram showing an example of a data structure of state transition table 22b generated by controller 23. State transition table 22b is information indicating which one of the first switching mode (i.e., with wait time) and the second switching mode (i.e., without wait time) is to be executed when controller 23 switches the lighting modes of lighting devices 11a to 11c (switches from the first lighting mode to the second lighting mode) according to lighting mode information 22a. As described above, in the first switching mode, the first lighting mode is maintained for the amount of wait time and then switched to the second lighting mode. In the second switching mode, the first lighting mode is switched to the second lighting mode at the moment when the combination of the results of detections has changed.

As shown in FIG. 7, in state transition table 22b, a type of the switching mode is registered for each combination of one of the lighting modes which is a candidate for the first lighting mode ("SWITCHED FROM") and a different one of the lighting modes which is a candidate for the second lighting mode ("SWITCHED TO"). In FIG. 7, the first switching mode and the second switching mode are denoted as "WITH WAIT TIME" and "WITHOUT WAIT TIME," respectively. State transition table 22b shown in FIG. 7, since it is generated according to the procedure illustrated in FIG. 4, indicates that lighting modes which are to transition to ones having lower priority levels are switched "with wait time (the first switching mode)" (otherwise, "without wait time (the second switching mode)"). Controller 23 generates state transition table 22b prior to performing the illumination control, and, during the illumination control, refers to state transition table 22b and switches the lighting modes, thereby quickly achieving the lighting-mode switching control.

After the above-described prior preparation, controller 23, first, obtains results of the detections by occupancy sensors 12a and 12b via detection result obtainer 21 (S21), as illustrated in FIG. 6. Controller 23 then refers to lighting mode information 22a stored in storage 22, and identifies a lighting mode corresponding to the combination of the results of detections by occupancy sensors 12a and 12b just obtained via detection result obtainer 21, that is, a lighting mode which is a candidate for a lighting mode switched to next (S22).

It should be noted that, in the series of repetitive processing from S21 through S28, controller 23 is holding information (information indicating, as the initial value, lighting mode 4 having a lowest priority level) indicative of the current lighting mode.

Next, controller 23 refers to state transition table 22b stored in storage 22 and determines a switching mode, that is, the presence or absence of wait time, which is used to switch the current lighting mode (the first lighting mode (switched from)) to the lighting mode (the second lighting mode (switched to)) corresponding to the combination of the results of detections by occupancy sensors 12a and 12b just obtained via detection result obtainer (S23).

As a result, if determined from state transition table 22b that the lighting modes are to be switched "with wait time (the first switching mode)" ("WITH WAIT TIME" in S23), controller 23, next, checks the expiration of the wait time (S24). Specifically, controller 23 includes a counter for the wait time (a wait-time counter) built therein, and checks if the wait-time counter reaches a value corresponding to the pre-set wait time.

As a result, if determined that the wait time is not expired ("NOT EXPIRED" in S24), controller 23 advances the wait-time counter by a predetermined value (e.g., a value corresponding to a time required to complete one series of the processing from S21 through S28) (S25). Then, controller 23, while maintaining the current lighting mode (S26), returns to the process of obtaining results of detections by occupancy sensors 12a and 12b (S21), and repeats the series of the processing (S21 through S28).

On the other hand, if determined in step S23 that the lighting modes are to be switched "without wait time (the second switching mode)" ("WITHOUT WAIT TIME" in S23), and if determined in step S24 that the wait time has expired ("EXPIRED" in S24), the subsequent processing is performed. Specifically, controller 23 controls lighting devices 11a to 11c to switch the current lighting modes of lighting devices 11a to 11c to the candidate for the lighting mode switched to (S27). Then, as post processing, controller 23 resets the wait-time counter (S28) and updates the information indicative of the current lighting mode so that the information indicates the lighting mode switched to (S26). Then, the above series of the processing from S21 through S28 is repeated.

Figure 8:
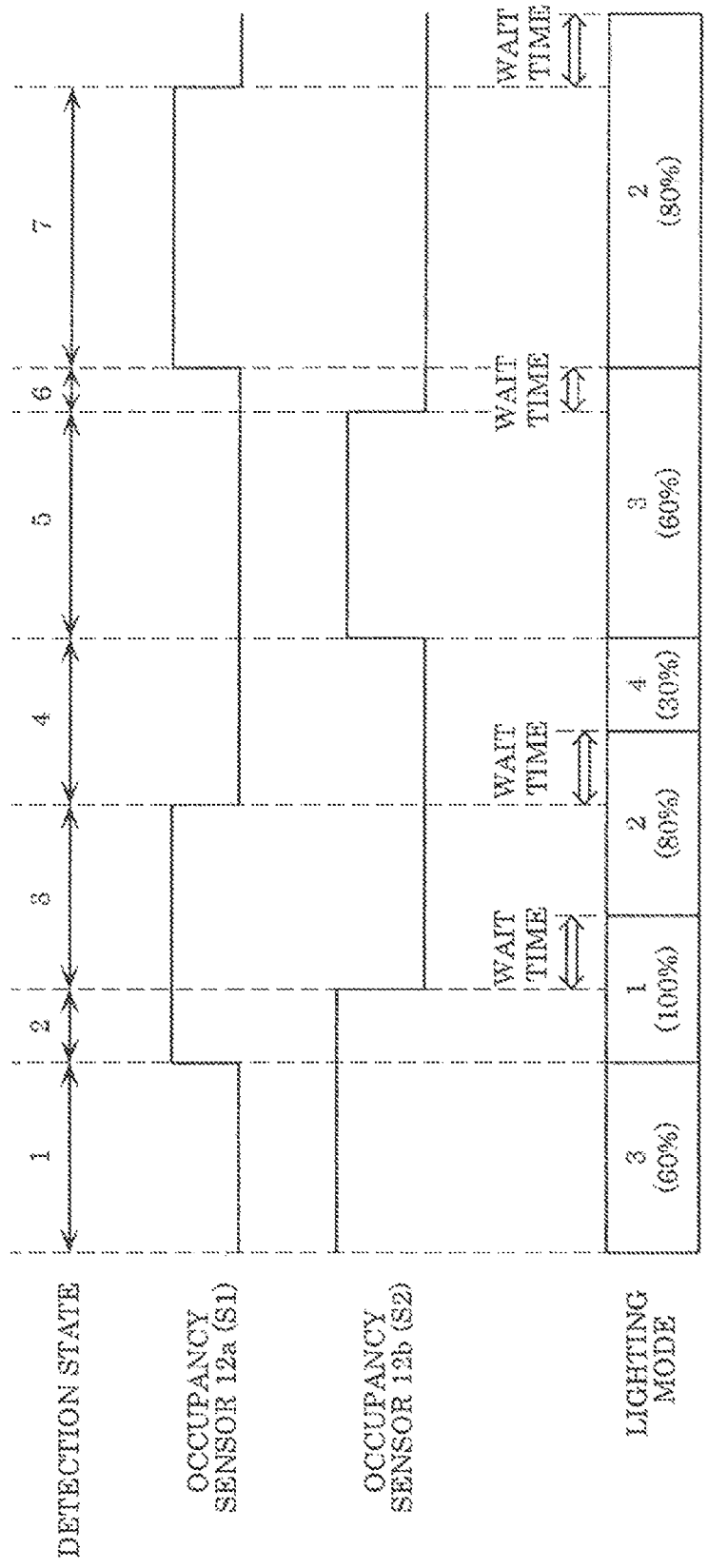
FIG. 8 is a timing diagram illustrating an example of specific operation of the illumination control system according to Embodiment 1.

FIG. 8 is a timing diagram illustrating an example of specific operation of illumination control system 10 according to the present embodiment. The figure shows the following: the combinations ("DETECTION STATE") of results of detections by occupancy sensors 12a and 12b; the results ("OCCUPANCY SENSOR 12a (S1)") of detections by occupancy sensor 12a; the results ("OCCUPANCY SENSOR 12b (S2)") of detections by occupancy sensor 12b; and the timings of "LIGHTING MODE." In "OCCUPANCY SENSOR 12a (S1)" and "OCCUPANCY SENSOR 12b (S2)," Hi level corresponds to "presence of a person is detected ("YES" in lighting mode information 22a)" and Low level corresponds to "no presence of a person is detected ("NO" in lighting mode information 22a)." In the timing diagram of "LIGHTING MODE", a type of each lighting mode is shown, followed by a spatial illuminance for the lighting mode in brackets below it.

As shown in FIG. 8, first, assume a state (detection state 1) where occupancy sensor 12a (S1) detects no presence of a person and occupancy sensor 12b (S2) detects presence of a person. In detection state 1, controller 23 refers to lighting mode information 22a and places lighting devices 11a to 11c in lighting mode 3.

Assume that person 16 then moves and the detection state changes from detection state 1 to detection state 2 (a state where occupancy sensor 12a (S1) detects presence of a person and occupancy sensor 12b (S2) detects presence of a person). In such a detection state transition, controller 23 refers to lighting mode information 22a and knows that the candidate for a lighting mode switched to is lighting mode 1. Controller 23 further refers to state transition table 22b and knows that the current lighting mode 3 is to be switched to lighting mode 1 "without wait time (the second switching mode)." Thus, controller 23 immediately switches the lighting modes of lighting devices 11a to 11c to lighting mode 1.

Assume that person 16 then moves and the detection state changes from detection state 2 to detection state 3 (a state where occupancy sensor 12a (S1) detects presence of a person and occupancy sensor 12b (S2) detects no presence of a person). In such a detection state transition, controller 23 refers to lighting mode information 22a and knows that the candidate for a lighting mode switched to is lighting mode 2. Controller 23 further refers to state transition table 22b and knows that the current lighting mode 1 is to be switched to lighting mode 2 "with wait time (the first switching mode)." Thus, controller 23 waits the amount of wait time from a moment when the detection state has changed and then switches the lighting modes of lighting devices 11a to 11c to lighting mode 2.

Assume that person 16 then moves and the detection state changes from detection state 3 to detection state 4 (a state where occupancy sensor 12a (S1) detects no presence of a person and occupancy sensor 12b (S2) detects no presence of a person). In such a detection state transition, controller 23 refers to lighting mode information 22a and knows that the candidate for a lighting mode switched to is lighting mode 4. Controller 23 further refers to state transition table 22b and knows that the current lighting mode 2 is to be switched to lighting mode 4 "with wait time (the first switching mode)." Thus, controller 23 waits the amount of wait time from a moment when the detection state has changed and then switches the lighting modes of lighting devices 11a to 11c to lighting mode 4.

Assume that person 16 then moves and the detection state changes from detection state 4 to detection state 5 (a state where occupancy sensor 12a (S1) detects no presence of a person and occupancy sensor 12b (S2) detects presence of a person). In such a detection state transition, controller 23 refers to lighting mode information 22a and knows that the candidate for a lighting mode switched to is lighting mode 3. Controller 23 further refers to state transition table 22b and knows that the current lighting mode 4 is to be switched to lighting mode 3 "without wait time (the second switching mode)." Thus, controller 23 immediately switches the lighting modes of lighting devices 11a to 11c to lighting mode 3 at a moment when the detection state has changed.

Assume that person 16 then moves and the detection state changes from detection state 5 to detection state 6 (a state where occupancy sensor 12a (S1) detects no presence of a person and occupancy sensor 12b (S2) detects no presence of a person). In such a detection state transition, controller 23 refers to lighting mode information 22a and knows that the candidate for a lighting mode switched to is lighting mode 4. Controller 23 further refers to state transition table 22b and knows that the current lighting mode 3 is to be switched to lighting mode 4 "with wait time (the first switching mode)." Thus, controller 23 waits the amount of wait time from a moment when the detection state has changed and attempts to switch the lighting modes of lighting devices 11a to 11c to lighting mode 4.

In this example transition, however, prior to the expiration of the wait time, the detection state changes from detection state 6 to detection state 7 (a state where occupancy sensor 12a (S1) detects presence of a person and occupancy sensor 12b (S2) detects no presence of a person). Thus, such a transition of the detection state is detected by the time the wait time expires. Consequently, controller 23 refers to lighting mode information 22a and knows that the candidate for a lighting mode switched to is lighting mode 2, rather than lighting mode 4 previously known. Controller 23 further refers to state transition table 22b and knows that the current lighting mode 3 is to be switched to lighting mode 2 "without wait time (the second switching mode)." Thus, controller 23 ends its waiting at a moment when the detection state has changed from detection state 6 to detection state 7 and switches the lighting modes of lighting devices 11a to 11c to lighting mode 2.

As described above, according to the present embodiment, in switching a lighting mode having a high priority level (i.e., a high spatial illuminance) to a lighting mode having a low priority level (here, a low spatial illuminance) lower than the high priority level, the immediately preceding lighting mode having the high priority level is maintained for the amount of wait time before switching to the lighting mode having the low priority level. This suppresses a rapid decrease of the spatial illuminance even if the detection state changes as person 16 moves, thereby preventing the moving person 16 from experiencing discomfort or being placed in a dangerous situation, etc. It should be noted that the correspondence between the priority level and the spatial illuminance is not limited to the above, a reversed relationship is permitted.

The wait time is set to a time longer than the time calculated by dividing, by the predetermined human walking speed, the greatest distance between any two occupancy sensors (here, occupancy sensors 12a and 12b) among the occupancy sensors installed in room 15. This allows the immediately preceding lighting mode to be maintained at least while person 16 is passing through the area which belongs to none of the detection ranges of occupancy sensors 12a and 12b. As a result, person 16 is prevented from experiencing discomfort or being placed in a dangerous situation, etc.

It should be noted that in switching a lighting mode having a low priority level (here, a low spatial illuminance) to a lighting mode having a high priority level (here, a high spatial illuminance) higher than the low priority level, the lighting mode having the low priority level is switched to the lighting mode having the high priority level immediately at a moment when the detection state has changed. Thus, the spatial illuminance is changed to the high spatial illuminance immediately when person 16 has moved to a space to which the high spatial illuminance is set. As a result, the moving person 16 does not experience discomfort.

Lighting mode information 22a can be altered. Specifically, controller 23 can obtain instructions from an operator of an input apparatus (not shown), and alter lighting mode information 22a stored in storage 22 according to the instructions. After lighting mode information 22a is altered, controller 23 updates state transition table 22b stored in storage 22 according to the procedure illustrated in FIG. 4, so that state transition table 22b is consistent with the altered lighting mode information 22a. After lighting mode information 22a is altered and state transition table 22b is updated, controller 23 performs the lighting-mode switching control (S21 through S28 in FIG. 6), using the altered lighting mode information 22a and the updated state transition table 22b.

FIG. 9A is a diagram showing an example method of altering of lighting mode information 22a. FIG. 9B is a diagram showing an example method of updating of state transition table 22b along with the alteration made to lighting mode information 22a shown in FIG. 9A. In this example, as shown in FIG. 9A, "SPATIAL ILLUMINANCE" and "PRIORITY LEVEL" corresponding to "LIGHTING MODE 2" and "LIGHTING MODE 4" are altered in lighting mode information 22a. Along with this, state transition table 22b is updated so as to be consistent with the altered lighting mode information 22a, by changing, as shown in FIG. 9B, the switching modes registered, to state transition table 22b, with respect to the lighting modes to which and from which "LIGHTING MODE 2" and "LIGHTING MODE 4" are to be switched.

In this manner, if lighting mode information 22a stored in storage 22 is altered, controller 23 updates state transition table 22b stored in storage 22, according to the alteration made to lighting mode information 22a. Then, controller 23 performs the lighting-mode switching control, using the altered lighting mode information 22a and the updated state transition table 22b. This allows the operator to alter the correspondence between the combination of the results of detections by occupancy sensors 12a and 12b and "ILLUMINATION CONTROL" (the lighting mode), and the correspondence between "ILLUMINATION CONTROL" (the lighting mode), details of the illumination control ("SPATIAL ILLUMINANCE"), and "PRIORITY LEVEL." Thus, illumination control system 10 is implemented, which has a flexible function capable of controlling of the lighting modes preferred by the operator.

While in the present embodiment, the "spatial illuminance" refers to the illuminance (if illuminances at a plurality of places are used, an average value of the illuminances) in at least one place predetermined as the representative place in room 15, the definition is not limited thereto. The "spatial illuminance" may be defined by the percentages of dimming (0% to 100%) of the lighting devices or may be defined by the units of luminous flux (lumens lm) of the lighting devices.

Part (a) of FIG. 10 is a diagram showing an example of an information table in which "SPATIAL ILLUMINANCE" is defined by the percentages of dimming of the lighting devices. In the information table shown in (a) of FIG. 10, four lighting modes are each associated with the percentages of dimming of five lighting devices ("LIGHT 1" to "LIGHT 5") and "SPATIAL ILLUMINANCE." "SPATIAL ILLUMINANCE" indicates an average value of the percentages of dimming of the five lighting devices ("LIGHT 1" to "LIGHT 5"). Such an information table is stored in storage 22. Controller 23 refers to the information table to switch the lighting modes and controls the percentages of dimming of the five lighting devices, thereby achieving the lighting modes defined by "SPATIAL ILLUMINANCE."

Part (b) of FIG. 10 is another example of the information table in which "SPATIAL ILLUMINANCE" is defined by the units of luminous flux of the lighting devices. In the information table shown in (b) of FIG. 10, four lighting modes are each associated with the units of luminous flux of four lighting devices ("LIGHT 1" to "LIGHT 4") and "SPATIAL ILLUMINANCE." "SPATIAL ILLUMINANCE" indicates the percentage of the sum of the units of luminous flux of the four lighting devices ("LIGHT 1" to "LIGHT 4") in each lighting mode, relative to the sum of the maximum units of luminous flux of the four lighting devices ("LIGHT 1" to "LIGHT 4"). Such an information table is stored in storage 22. Controller 23 refers to the information table to switch the lighting modes and controls the units of luminous flux of the four lighting devices, thereby achieving the lighting modes defined by "SPATIAL ILLUMINANCE."

Embodiment 2

Next, an illumination control apparatus and an illumination control method according to the present disclosure is described in detail, with reference to Embodiment 2 (herein, an illumination control system) according to the present disclosure. While in Embodiment 1, the lighting modes correspond to the illumination scenes defined by the spatial illuminances in room, lighting modes in the present embodiment correspond to illumination scenes defined by color temperatures of illumination light beams from lighting devices. In the following, description is to be set forth, focusing on differences from Embodiment 1.

Figure 11:
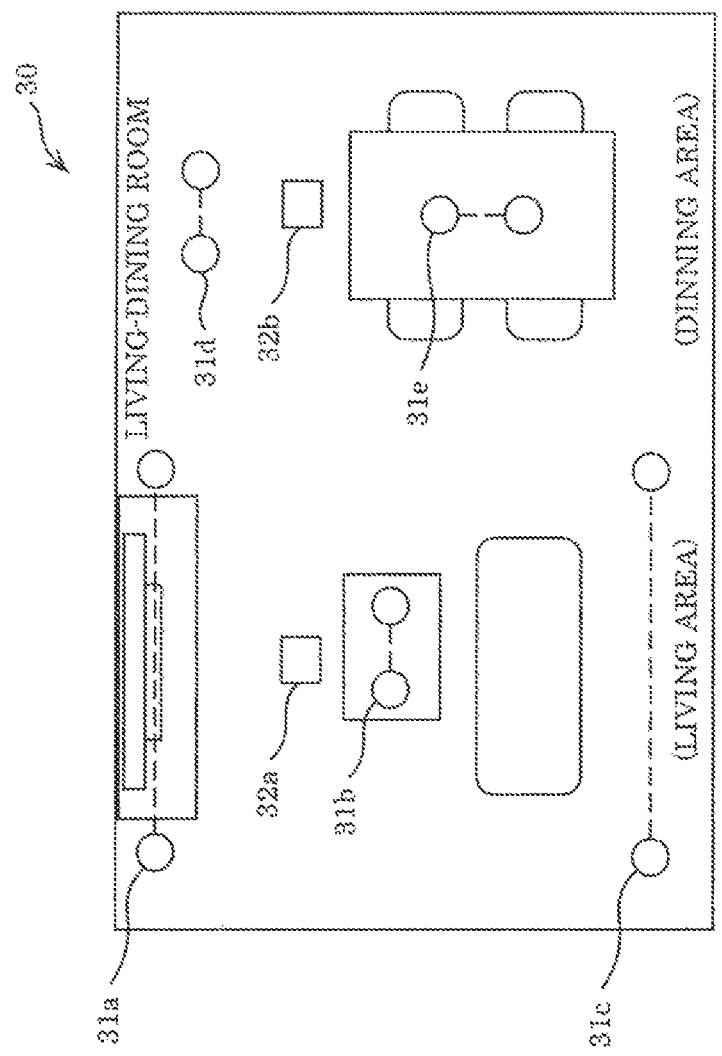
FIG. 11 is a diagram illustrating a situation to which an illumination control system according to Embodiment 2 applies.

FIG. 11 is a diagram illustrating a situation to which illumination control system 30 according to the present embodiment applies. Here, an example is illustrated where illumination control system 30 is provided in a living-dining room. The left area in FIG. 11 is a living area and the right area in FIG. 11 is a dining area. The living area and the dining area constitute one room, without a partition therebetween.

Illumination control system 30 is a system which controls illumination, in conjunction with results of detections by occupancy sensors. Illumination control system 30 includes five lighting devices 31a, 31b, 31c, 31d, and 31e, two occupancy sensors 32a and 32b, and illumination control apparatus 40.

Lighting devices 31a, 31b, 31c, 31d, and 31e are devices which together provide illuminations in a plurality of lighting modes, under control by illumination control apparatus 40 (FIG. 12), and are each, for example, a downlight or a ceiling light which includes an LED light source. Among lighting devices 31a to 31e, lighting devices 31a, 31b, and 31c are installed in the living area and lighting devices 31d and 31e are installed in the dining area. The "lighting modes" as used herein refer to operation modes of lighting devices 31a to 31e, and are, in the present embodiment, operation modes which achieve illumination scenes each defined by a color temperature of illumination light.

Occupancy sensors 32a and 32b each detect presence or absence of a person, using, for example, infrared light, an ultrasound, or visible light. Among occupancy sensors 32a and 32b, occupancy sensor 32a is installed in the living-room area and occupancy sensor 32b is installed in the dining area.

Illumination control apparatus 40 controls the illumination of a room by controlling lighting devices 31a to 31e based on a combination of results of detections by occupancy sensors 32a and 32a. Illumination control apparatus 40 provides illumination control with which a person is prevented from experiencing discomfort or being placed in a dangerous situation, even if the person moves, passing through an area which belongs to none of the detection ranges of occupancy sensors 32a and 32a.

While five lighting devices 31a, 31b, 31c, 31d, and 31e are shown in FIG. 11, the present disclosure is not limited thereto. At least one lighting device may be provided. This is because it is possible that even at least one lighting device implements a plurality of lighting modes (illumination scenes using a plurality of illumination light beams having different color temperatures). However, preferably, a plurality of lighting devices are provided, in order to implement various illumination scenes (the lighting modes).

While two occupancy sensors 32a and 32b are shown in FIG. 11, three or more occupancy sensors may be provided. Moreover, while an input apparatus, such as a remote control and operating switches for manually operating lighting devices 31a to 31e, is not shown in FIG. 11, such an input apparatus may be provided. The input apparatus may be a smartphone or a tablet, for example.

Figure 12:
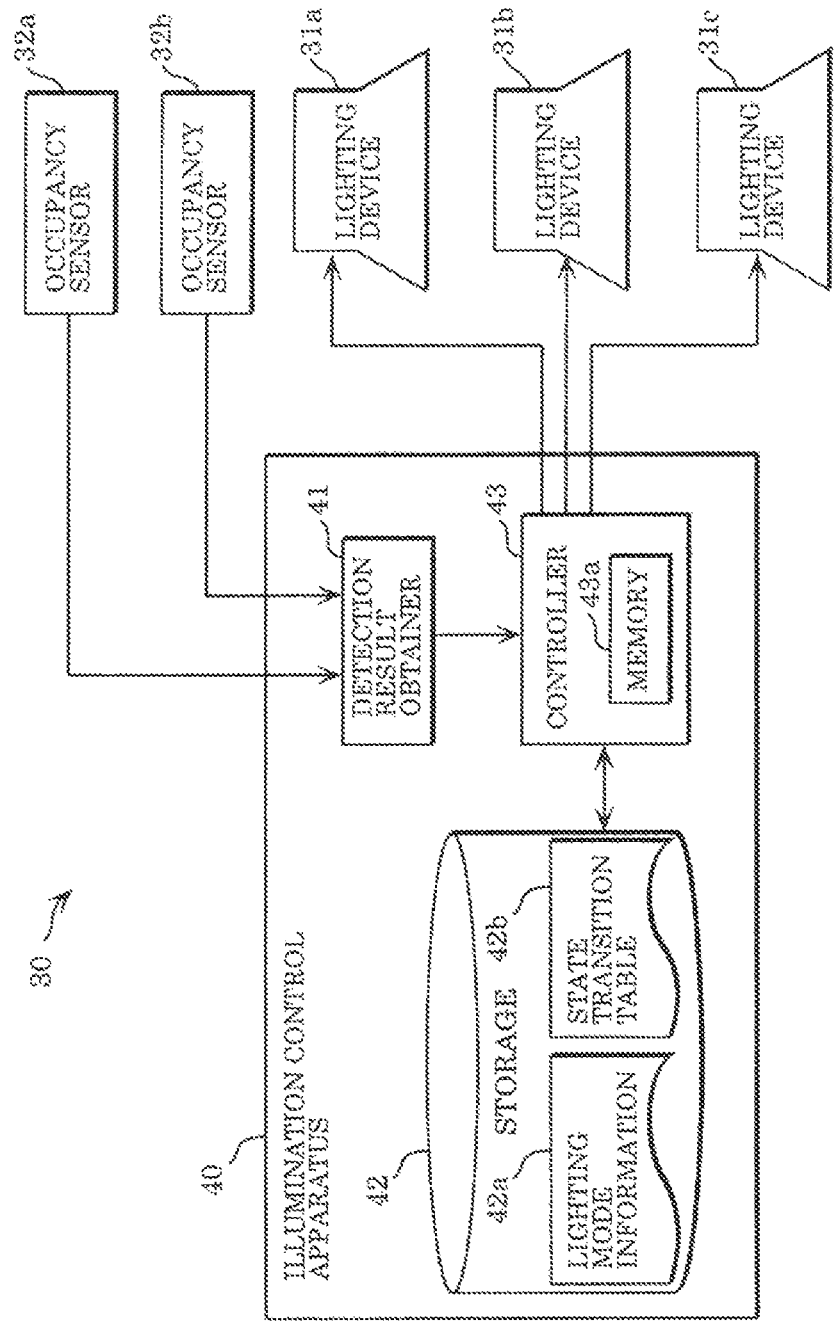
FIG. 12 is a block diagram of a configuration of the illumination control system according to Embodiment 2.

FIG. 12 is a block diagram of a configuration of illumination control system 30 shown in FIG. 11. As shown in the figure, illumination control system 30 includes lighting devices 31a, 31b, 31c, 31d, and 31e, occupancy sensors 32a and 32b, and illumination control apparatus 40 which is connected via wires or wirelessly to lighting devices 31a, 31b, 31c, 31d, and 31e and occupancy sensors 32a and 32b.

Illumination control apparatus 40 controls the illumination of room 15 in which one or more lighting devices (here, lighting devices 31a to 31e) each having a plurality of lighting modes and two or more occupancy sensors (here, occupancy sensors 32a and 32b) are installed. Illumination control apparatus 40 includes detection result obtainer 41, storage 42, and controller 43.

Detection result obtainer 41 is by way of example a processing unit, such as a microcomputer, which obtains results of detections by occupancy sensors 32a and 32b, and includes, for example, a communication interface which receives signals transmitted via hard wire or wirelessly from occupancy sensors 32a and 32b, and simple logic gates, or the like.

Storage 42 is a storage medium storing lighting mode information 42a and state transition table 42b, and is, for example, a nonvolatile storage memory such as read-only-memory (ROM).

Lighting mode information 42a is pre-created information such a table as shown in FIG. 13, for example, and indicates correspondence between (i) plural combinations of the results of detections by occupancy sensors 32a and 32b and (ii) the plural lighting modes of lighting devices 31a to 31e.

FIG. 13 is a diagram showing an example of a data structure of lighting mode information 42a. Here, the figure shows correspondence between: the combinations of the results of detections by occupancy sensors 32a and 32b ("S1" and "S2" corresponds to the results of detections by occupancy sensors 32a and 32b, respectively); "ILLUMINATION CONTROL" (the lighting modes); details of the illumination control ("COLOR TEMPERATURE"); and "PRIORITY LEVEL." "YES" and "NO" in the detection result ("S1", "S2") fields correspond to "presence of a person is detected" and "no presence of a person is detected," respectively. The "PRIORITY LEVEL" indicates priority levels associated with the lighting modes, where the higher the "COLOR TEMPERATURE" is, the higher (the smaller numeric value) the priority level is set.

"COLOR TEMPERATURE" as used herein refers to a color temperature of illumination light emitted by at least one lighting device previously selected as a representative lighting device from among lighting devices 31a to 31e (if a plurality of lighting devices are selected, an average value of color temperatures of illumination light beams emitted by the plurality of lighting devices). In the present embodiment, the color temperature in lighting mode 1 is an average color temperature of the illumination light beams emitted by lighting devices 31a to 31e, which is 5000K. Lighting mode 1 is an operation mode which illuminates a space, regardless of the application. The color temperature in lighting mode 2 is an average color temperature of illumination light beams emitted by lighting devices 31a to 31e, which is 2800K. Lighting mode 2 is an operation mode which produces a relaxing atmosphere. The color temperature in lighting mode 3 is an average color temperature of illumination light beams emitted by lighting devices 31a to 31e, which is 6200K. Lighting mode 3 is an operation mode which provides lighting suited for study and reading. The color temperature in lighting mode 4 is an average color temperature of illumination light beams emitted by lighting devices 31a to 31e, which is 2500K. Lighting mode 4 is an operation mode which provides lighting suited for bedtime.

It should be noted that the data structure of lighting mode information 42a is not limited to the structure shown in FIG. 13. For example, lighting mode information 42a may be provided in separate tables, one of which indicating correspondence between the combinations of the results of detections by occupancy sensors 32a and 32b and "ILLUMINATION CONTROL" (the lighting modes), the other of which indicating correspondence between "ILLUMINATION CONTROL" (the lighting modes), details of the illumination control ("COLOR TEMPERATURE"), and "PRIORITY LEVEL."

State transition table 42b is referred to by controller 43 when controller 43 switches the lighting modes of lighting devices 31a to 31e. State transition table 42b is dynamically created by controller 43 from lighting mode information 42a before controller 43 initiates the illumination control. State transition table 42b described below in detail.

Controller 43 includes memory 43a, and is a processing unit which refers to lighting mode information 42a and controls lighting devices 31a to 31e according to a combination of the results of detections by occupancy sensors 32a and 32b obtained by detection result obtainer 41. Controller 43 is, for example, a microcomputer having a program stored in memory 43a or the like. The program stored in memory 43a, when executed by the microcomputer, causes the microcomputer to carry out the functions and controls described herein. More specifically, by referring to lighting mode information 42a, controller 43 identifies a lighting mode corresponding to the combination of the results of detections by occupancy sensors 32a and 32b obtained by detection result obtainer 41. Then, controller 43 controls (here, tones colors of light emitted by) lighting devices 331a to 31e such that lighting devices 31a to 31e are placed in the identified lighting mode. For example, if lighting devices 31a to 31e are downlights, controller 43 performs, on lighting devices 31a to 31e, phase-control dimming, or diming via dedicated control lines to lighting devices 31a to 31e. The phase-control dimming is performed by controlling the phases of power which is supplied to lighting devices 31a to 31e. If lighting devices 31a to 31e are ceiling lights, controller 43 performs PWM (pulse width modulation) dimming on lighting devices 31a to 31e by sending dimming signals (duty signals) to lighting devices 31a to 31e using infrared light or wireless signals. If lighting devices 31a to 31e are ceiling lights, controller 43 performs the PWM dimming on lighting devices 31a to 31e by sending dimming signals (duty signals) to lighting devices 31a to 31e using infrared light or wireless signals.

Here, as characteristic control, controller 43 employs a wait time which depends on a lighting mode to be switched to, by using priority in switching the lighting modes when the combination of the results of detections by occupancy sensors 32a and 32b obtained by detection result obtainer 41 changes. The function of the lighting-mode switching control performed by controller 43 using the priority is as illustrated in the flowchart in FIG. 4, as with Embodiment 1. In switching a lighting mode having a high priority level (i.e., high color temperature) to a lighting mode having a low priority level (here, low color temperature) lower than the high priority level, controller 43 maintains the immediately preceding lighting mode having the high priority level for the amount of wait time before switching to the lighting mode having the low priority level. Thus, the moving person is prevented from experiencing discomfort or being placed in a dangerous situation. Thus, a moving person is prevented from experiencing discomfort or being placed in a dangerous situation. It should be noted that in the present embodiment also, "wait time" is as defined with reference to FIG. 5, as with Embodiment 1.

Next, operation of illumination control system 30 according to the present embodiment configured as set forth above is described.

Basic operation of illumination control system 30 according to the present embodiment is as illustrated in the flowchart in FIG. 6, as with Embodiment 1.

As with Embodiment 1, in the present embodiment also, controller 23 included in illumination control apparatus 40 generates, prior to the illumination control, state transition table 42b from lighting mode information 42a stored in storage 42 according to the procedure illustrated in FIG. 4, and stores state transition table 42b into storage 42. This generation process is performed one time only unless lighting mode information 42a is altered.

FIG. 14 is a diagram showing an example of a data structure of state transition table 42b generated by controller 43. State transition table 42b is information indicating which one of the first switching mode (i.e., with wait time) and the second switching mode (i.e., without wait time) is to be executed when controller 43 switches the lighting modes of lighting devices 31a to 31e (switches from the first lighting mode to the second lighting mode) according to lighting mode information 42a. In the first switching mode, the first lighting mode is maintained for the amount of wait time and then switched to the second lighting mode. In the second switching mode, the first lighting mode is switched to the second lighting mode at the moment when the combination of the results of detections has changed.

As shown in FIG. 14, in state transition table 42b, a type of the switching mode is registered for each combination of one of the lighting modes which is a candidate for the first lighting mode ("SWITCHED FROM") and a different one of the lighting modes which is a candidate for the second lighting mode ("SWITCHED TO"). In FIG. 14, the first switching mode and the second switching mode are denoted as "WITH WAIT TIME" and "WITHOUT WAIT TIME," respectively. State transition table 42b shown in FIG. 14 indicates, as with Embodiment 1, that lighting modes which are to transition to ones having lower priority levels are switched "with wait time (the first switching mode)" (otherwise, "without wait time (the second switching mode)").

After the above-described prior preparation, controller 43 performs the illumination control according to the procedure illustrated in the flowchart in FIG. 6. Specifically, controller 43, first, obtains results of the detections by occupancy sensors 32a and 32b via detection result obtainer 41 (S21), as illustrated in FIG. 6. Controller 43 then refers to lighting mode information 42a stored in storage 42, and identifies a lighting mode corresponding to the combination of the results of detections by occupancy sensors 32a and 32b just obtained via detection result obtainer 41, that is, a lighting mode which is a candidate for a lighting mode switched to next (S22).

It should be noted that, in the series of repetitive processing from S21 through S28, controller 43 is holding information (information indicating, as the initial value, lighting mode 4 having a lowest priority level) indicative of the current illumination.

Next, controller 43 refers to state transition table 42b stored in storage 42 and determines a switching mode, that is, the presence or absence of wait time, which is used to switch the current lighting mode (the first lighting mode (switched from)) to the lighting mode (the second lighting mode (switched to)) corresponding to the combination of the results of detections by occupancy sensors 32a and 32b just obtained via detection result obtainer (S23).

As a result, if determined from state transition table 42b that the lighting modes are to be switched "with wait time (the first switching mode)" ("WITH WAIT TIME" in S23), controller 43, next, checks the expiration of the wait time (S24). Specifically, controller 43 includes a counter for the wait time (a wait-time counter) built therein, and checks if the wait-time counter reaches a value corresponding to the pre-set wait time.

As a result, if determined that the wait time is not expired ("NOT EXPIRED" in S24), controller 43 advances the wait-time counter by a predetermined value (e.g., a value corresponding to a time required to complete one series of the processing from S21 through S28) (S25). Then, controller 43, while maintaining the current lighting mode (S26), returns to the process of obtaining results of detections by occupancy sensors 32a and 32b (S21), and repeats the series of the processing (S21 through S28).

On the other hand, if determined in step S23 that the lighting modes are to be switched "without wait time (the second switching mode)" ("WITHOUT WAIT TIME" in S23), and if determined in step S24 that the wait time has expired ("EXPIRED" in S24), the subsequent processing is performed. Specifically, controller 43 controls lighting devices 31a to 31e to switch the current lighting modes of lighting devices 31a to 31e to the candidate for the lighting mode switched to (S27). Then, as post processing, controller 43 resets the wait-time counter (S28) and updates the information indicative of the current lighting mode so that the information indicates the lighting mode switched to (S26). Then, the above series of the processing from S21 through S28 is repeated.

Figure 15:
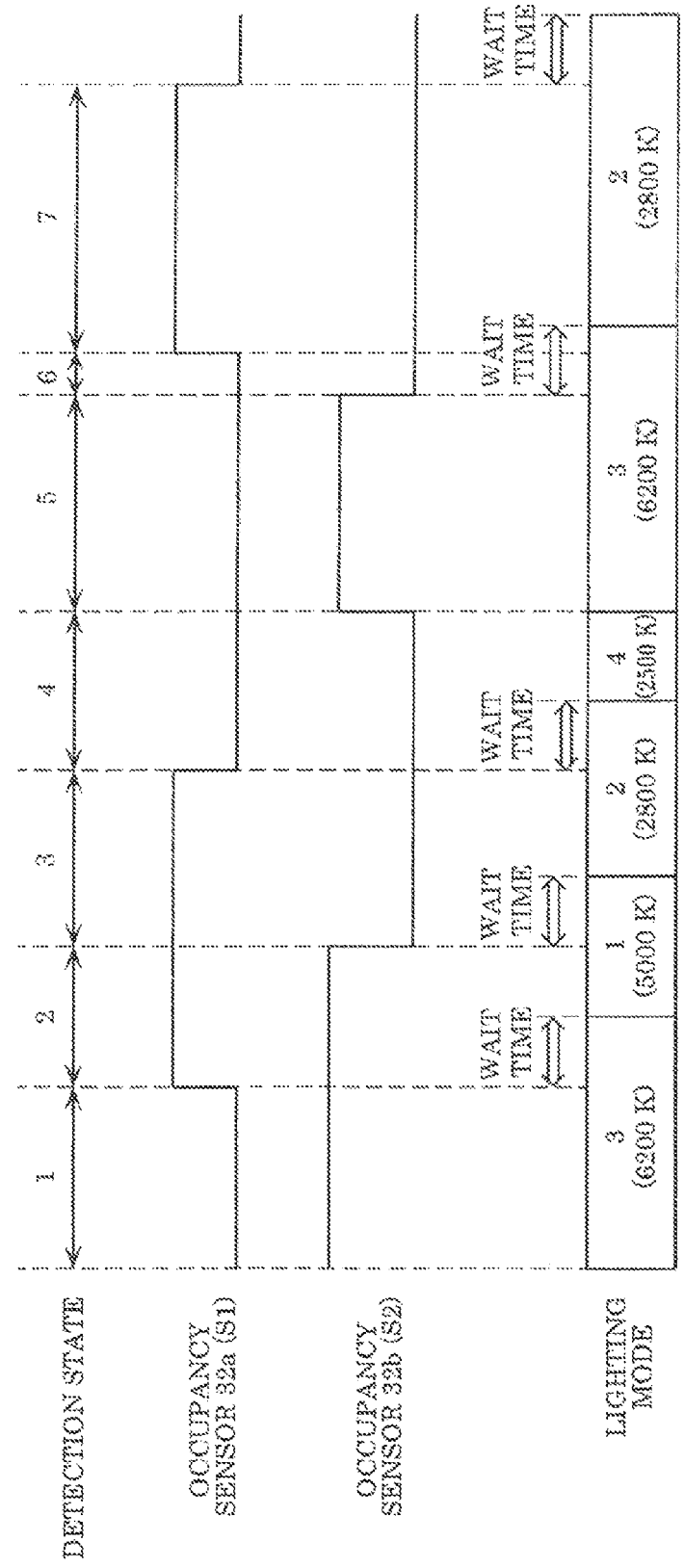
FIG. 15 is a timing diagram illustrating an example of specific operation of the illumination control system according to Embodiment 2.

FIG. 15 is a timing diagram illustrating an example of specific operation of illumination control system 30 according to the present embodiment. The figure shows the following: the combinations ("DETECTION STATE") of results of detections by occupancy sensors 32a and 32b; the results ("OCCUPANCY SENSOR 32a (S1)") of detections by occupancy sensor 32a; the results ("OCCUPANCY SENSOR 32b (S2)") of detections by occupancy sensor 32b; and the timings of "LIGHTING MODE." In "OCCUPANCY SENSOR 32a (S1)" and "OCCUPANCY SENSOR 32b (S2)," Hi level corresponds to "presence of a person is detected ("YES" in lighting mode information 42a)" and Low level corresponds to "no presence of a person is detected ("NO" in lighting mode information 42a)." In the timing diagram of "LIGHTING MODE", a type of each lighting mode is shown, followed by a color temperature for the lighting mode in brackets below it.

As shown in FIG. 15, first, assume a state (detection state 1) where occupancy sensor 32a (S1) detects no presence of a person and occupancy sensor 32b (S2) detects presence of a person. In detection state 1, controller 43 refers to lighting mode information 42a and places lighting devices 31a to 31e in lighting mode 3.

Assume that the person then moves and the detection state changes from detection state 1 to detection state 2 (a state where occupancy sensor 32a (S1) detects presence of a person and occupancy sensor 32b (S2) detects presence of a person). In such a detection state transition, controller 43 refers to lighting mode information 42a and knows that the candidate for a lighting mode switched to is lighting mode 1. Controller 43 further refers to state transition table 42b and knows that the current lighting mode 3 is to be switched to lighting mode 1 "with wait time (the first switching mode)." Thus, controller 43 waits the amount of wait time from a moment when the detection state has changed and then switches the lighting modes of lighting devices 31a to 31e to lighting mode 1.

Assume that the person then moves and the detection state changes from detection state 2 to detection state 3 (a state where occupancy sensor 32a (S1) detects presence of a person and occupancy sensor 32b (S2) detects no presence of a person). In such a detection state transition, controller 43 refers to lighting mode information 42a and knows that the candidate for a lighting mode switched to is lighting mode 2. Controller 43 further refers to state transition table 42b and knows that the current lighting mode 1 is to be switched to lighting mode 2 "with wait time (the first switching mode)." Thus, controller 43 waits the amount of wait time from a moment when the detection state has changed and then switches the lighting modes of lighting devices 31a to 31e to lighting mode 2.

Assume that the person then moves and the detection state changes from detection state 3 to detection state 4 (a state where occupancy sensor 32a (S1) detects no presence of a person and occupancy sensor 32b (S2) detects no presence of a person). In such a detection state transition, controller 43 refers to lighting mode information 42a and knows that the candidate for a lighting mode switched to is lighting mode 4. Controller 43 further refers to state transition table 42b and knows that the current lighting mode 2 is to be switched to lighting mode 4 "with wait time (the first switching mode)." Thus, controller 43 waits the amount of wait time from a moment when the detection state has changed and then switches the lighting modes of lighting devices 31a to 31e to lighting mode 4.

Assume that the person then moves and the detection state changes from detection state 4 to detection state 5 (a state where occupancy sensor 32a (S1) detects no presence of a person and occupancy sensor 32b (S2) detects presence of a person). In such a detection state transition, controller 43 refers to lighting mode information 42a and knows that the candidate for a lighting mode switched to is lighting mode 3. Controller 43 further refers to state transition table 42b and knows that the current lighting mode 4 is to be switched to lighting mode 3 "without wait time (the second switching mode)." Thus, controller 43 immediately switches the lighting modes of lighting devices 31a to 31e to lighting mode 3 at a moment when the detection state has changed.

Assume that the person then moves and the detection state changes from detection state 5 to detection state 6 (a state where occupancy sensor 32a (S1) detects no presence of a person and occupancy sensor 32b (S2) detects no presence of a person). In such a detection state transition, controller 43 refers to lighting mode information 42a and knows that the candidate for a lighting mode switched to is lighting mode 4. Controller 43 further refers to state transition table 42b and knows that the current lighting mode 3 is to be switched to lighting mode 4 "with wait time (the first switching mode)." Thus, controller 43 waits the amount of wait time from a moment when the detection state has changed and attempts to switch the lighting modes of lighting devices 31a to 31e to lighting mode 4.

In this example transition, however, prior to the expiration of the wait time, the detection state changes from detection state 6 to detection state 7 (a state where occupancy sensor 32a (S1) detects presence of a person and occupancy sensor 32b (S2) detects no presence of a person). Thus, such a transition of the detection state is detected by the time the wait time expires. Consequently, controller 43 refers to lighting mode information 42a and knows that the candidate for a lighting mode switched to is lighting mode 2, rather than lighting mode 4 previously known. Controller 43 further refers to state transition table 42b and knows that the current lighting mode 3 is to be switched to lighting mode 2 "with wait time (the first switching mode)." Thus, controller 43 waits the amount of wait time from a moment when the detection state has changed from detection state 5 to detection state 6, and then switches the lighting modes of lighting devices 31a to 31e to lighting mode 2.

As described above, according to the present embodiment, in switching a lighting mode having a high priority level (here, a high color temperature) to a lighting mode having a low priority level (i.e., a low color temperature) lower than the high priority level, the immediately preceding lighting mode having the high priority level is maintained for the amount of wait time before switching to the lighting mode having the low priority level. This suppresses a rapid decrease of the color temperature even if the detection state changes as the person moves, thereby preventing the moving person from experiencing discomfort or being placed in a dangerous situation, etc.

It should be noted that in switching a lighting mode having a low priority level (here, a low color temperature) to a lighting mode having a high priority level (here, a high color temperature) higher than the low priority level, the lighting mode having the low priority level is switched to the lighting mode having the high priority level immediately at a moment when the detection state has changed.

Thus, the color temperature is changed to the high color temperature immediately when the person has moved to a space to which the high color temperature is set. As a result, the moving person does not experience discomfort.

Lighting mode information 42a can be altered, as with Embodiment 1. Specifically, controller 43 can obtain instructions from an operator of an input apparatus (not shown), and alter lighting mode information 42a stored in storage 42 according to the instructions. After lighting mode information 42a is altered, controller 43 updates state transition table 42b stored in storage 42 according to the procedure illustrated in FIG. 4, so that state transition table 42b is consistent with the altered lighting mode information 42a. After lighting mode information 42a is altered and state transition table 42b is updated, controller 43 performs the lighting-mode switching control (S21 through S28 in FIG. 6), using the altered lighting mode information 42a and the updated state transition table 42b.

In this manner, if lighting mode information 42a stored in storage 42 is altered, controller 43 updates state transition table 42b stored in storage 42, according to the alteration made to lighting mode information 42a. Then, controller 43 performs the lighting-mode switching control, using the altered lighting mode information 42a and the updated state transition table 42b. This allows the operator to alter the correspondence between the combination of the results of detections by occupancy sensors 32a and 32b and "ILLUMINATION CONTROL" (the lighting mode), and the correspondence between "ILLUMINATION CONTROL" (the lighting mode), details of the illumination control ("COLOR TEMPERATURE"), and "PRIORITY LEVEL." Thus, illumination control system 30 is implemented, which has a flexible function capable of controlling of the lighting modes preferred by the operator.

As described above, in Embodiments 1 and 2 described above, the illumination control apparatus executes the illumination control method for controlling illumination of a room in which at least one lighting device having a plurality of lighting modes and at least two occupancy sensors are installed. The illumination control method includes: (a) obtaining results of detections by the at least two occupancy sensors; and (b) referring to lighting mode information indicating correspondence between (i) plural combinations of the results of the detections by the at least two occupancy sensors and (ii) the plural lighting modes of the at least one lighting device, identifying and lighting mode among the plural lighting modes that corresponds to a combination of the results of the detections by the at least two occupancy sensors obtained in step (a), and placing the at least one lighting device in the identified lighting mode, where in switching a first lighting mode to a second lighting mode when the combination of the results of the detections by the at least two occupancy sensors obtained in step (a) changes, in step (b), the first lighting mode and the second lighting mode being included in the plurality of lighting modes: a first priority level of the first lighting mode and a second priority level of the second lighting mode are compared, the first priority level and the second priority level being priority levels pre-assigned to the first lighting mode and the second lighting mode, respectively; if the second priority level is lower than the first priority level, the first lighting mode is maintained for a predetermined amount of wait time, from a moment when the combination of the results of the detections changes, and subsequently the first lighting mode is switched to the second lighting mode; and if the second priority level is higher than the first priority level, the first lighting mode is switched to the second lighting mode at the moment when the combination of the results of the detections changes.

Accordingly, in switching a lighting mode having a high priority level (i.e., a high spatial illuminance or a high color temperature) to a lighting mode having a low priority level (here, a low spatial illuminance or a low color temperature) lower than the high priority level, the immediately preceding lighting mode having the high priority level is maintained for the amount of wait time before switching to the lighting mode having the low priority level. This suppresses a rapid decrease of the spatial illuminance or the color temperature even if the detection state changes as the person moves, thereby preventing the moving person from experiencing discomfort or being placed in a dangerous situation, etc.

While the illumination control apparatus and the illumination control method according to the present disclosure have been described with reference to Embodiments 1 and 2, the present disclosure is not limited to Embodiments 1 and 2. Various modifications to Embodiment 1 or 2 that may be conceived by a person skilled in the art or other embodiments from combinations of some of the components according to Embodiment 1 and 2 are intended to be included within the scope of the disclosure, without departing from the spirit of the present disclosure.

For example, in Embodiment 1 or 2 described above, an illuminance sensor connected to the illumination control apparatus may be provided in room 15 (or the living-dining room). The illumination control apparatus may execute the illumination control illustrated in FIG. 6 if an illuminance detected by the illuminance sensor exceeds (or does not exceed) a predetermined value. This causes the illumination control according to Embodiment 1 or 2 described above to be performed, for example, at night where the risk in moving in the room increases, thereby preventing a moving person from experiencing discomfort or being placed in a dangerous situation, etc.

Moreover, while in Embodiments 1 and 2 described above, controller 23 generates the state transition table from lighting mode information, prior to performing the illumination control, and in illumination control, refers to the state transition table and switches the lighting modes, the present disclosure is not limited to this approach. Controller 23 may not generate the state transition table. In the illumination control, controller 23 may refer to the lighting mode information and determine a switching mode (from the first switching mode to the second switching mode).

Moreover, the present disclosure can be implemented not only as the illumination control apparatus, the illumination control method, and the illumination control system according to Embodiments 1 and 2 described above, but also as a program for implementing the functionality of the controller included in the illumination control apparatus. Further, the present disclosure may also be implemented as a computer-readable recording medium storing the program, such as a DVD.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination control apparatus which controls illumination of a room in which at least one lighting device having plural lighting modes and at least two occupancy sensors are installed, the illumination control apparatus comprising:
 a detection result obtainer which obtains results of detections by the at least two occupancy sensors;
 a storage storing lighting mode information indicating correspondence between (i) plural combinations of the results of the detections by the at least two occupancy sensors and (ii) the plural lighting modes of the at least one lighting device; and
 a controller which refers to the lighting mode information, identifies a lighting mode among the plural lighting modes that corresponds to a combination of the results of the detections by the at least two occupancy sensors obtained by the detection result obtainer, and places the at least one lighting device in the identified lighting mode, wherein
 in switching a first lighting mode to a second lighting mode when the combination of the results of the detections by the at least two occupancy sensors obtained by the detection result obtainer changes, the first lighting mode and the second lighting mode being included in the plural lighting modes, the controller:
  compares a first priority level of the first lighting mode and a second priority level of the second lighting mode, the first priority level and the second priority level being priority levels pre-assigned to the first lighting mode and the second lighting mode, respectively;
  if the second priority level is lower than the first priority level, maintains the first lighting mode for a predetermined amount of wait time, from a moment when the combination of the results of the detections changes, and subsequently switches the first lighting mode to the second lighting mode; and
  if the second priority level is higher than the first priority level, switches the first lighting mode to the second lighting mode at the moment when the combination of the results of the detections changes.

2. The illumination control apparatus according to claim 1, wherein
  the plural lighting modes are operation modes of the at least one lighting device, for achieving illumination scenes each defined by a spatial illuminance in the room, and
  for each of the priority levels, the higher the spatial illuminance is, the higher value the priority level is set to.

3. The illumination control apparatus according to claim 1, wherein
  the plural lighting modes are operation modes of the at least one lighting device, for achieving illumination scenes each defined by a color temperature of illumination light from the at least one lighting device, and
  for each of the priority levels, the higher the color temperature is, the higher value the priority level is set to.

4. The illumination control apparatus according to claim 1, wherein
  the predetermined amount of wait time is longer than an amount of time calculated by dividing, by a predetermined human walking speed, the greatest distance between any two occupancy sensors among the at least two occupancy sensors.

5. The illumination control apparatus according to claim 1, wherein
  the storage is further storing a state transition table indicating, for each combination of one of the plural lighting modes which is a candidate for the first lighting mode and a different one of the plural lighting modes which is a candidate for the second lighting mode, whether the controller is to execute a first switching mode in which the first lighting mode is maintained for the predetermined amount of wait time and subsequently switched to the second lighting mode, or a second switching mode in which the first lighting mode is switched to the second lighting mode at the moment when the combination of the results of the detections changes, and
  if the lighting mode information stored in the storage changes, the controller updates the state transition table stored in the storage according to the change in the lighting mode information, and switches the first lighting mode to the second lighting mode according to the updated state transition table.

6. An illumination control method for controlling illumination of a room in which at least one lighting device having plural lighting modes and at least two occupancy sensors are installed, the illumination control method comprising:
  (a) obtaining results of detections by the at least two occupancy sensors; and
  (b) referring to lighting mode information indicating correspondence between (i) plural combinations of the results of the detections by the at least two occupancy sensors and (ii) the plural lighting modes of the at least one lighting device,
  identifying a lighting mode among the plural lighting modes that corresponds to a combination of the results of the detections by the at least two occupancy sensors obtained in step (a), and
  placing the at least one lighting device in the identified lighting mode, wherein
  in switching a first lighting mode to a second lighting mode when the combination of the results of the detections by the at least two occupancy sensors obtained in step (a) changes, the first lighting mode and the second lighting mode being included in the plural lighting modes, in step (b):
  a first priority level of the first lighting mode and a second priority level of the second lighting mode are compared, the first priority level and the second priority level being priority levels pre-assigned to the first lighting mode and the second lighting mode, respectively;
  if the second priority level is lower than the first priority level, the first lighting mode is maintained for a predetermined amount of wait time, from a moment when the combination of the results of the detections changes, and subsequently the first lighting mode is switched to the second lighting mode; and
  if the second priority level is higher than the first priority level, the first lighting mode is switched to the second lighting mode at the moment when the combination of the results of the detections changes.

7. A non-transitory computer-readable storage medium storing a program for an illumination control apparatus which controls illumination of a room in which at least one lighting device having plural lighting modes and at least two occupancy sensors are installed, the program when executed by a controller, carries out the illumination control method according to claim 6.

* * * * *